(12) United States Patent
Goldberg et al.

(10) Patent No.: US 8,583,727 B2
(45) Date of Patent: Nov. 12, 2013

(54) DEPOSITION EXHIBIT MANAGEMENT SYSTEM

(75) Inventors: Jay L. Goldberg, West Orange, NJ (US); Steven Strauss, Bedminster, NJ (US)

(73) Assignee: Veritext Corp., Florham Park, NJ (US)

( * ) Notice: Subject to any disclaimer, the term of this patent is extended or adjusted under 35 U.S.C. 154(b) by 150 days.

(21) Appl. No.: 12/977,628

(22) Filed: Dec. 23, 2010

(65) Prior Publication Data

US 2011/0153732 A1    Jun. 23, 2011

Related U.S. Application Data

(60) Provisional application No. 61/289,788, filed on Dec. 23, 2009.

(51) Int. Cl.
*G06F 15/16* (2006.01)

(52) U.S. Cl.
USPC ............ 709/203; 709/201; 709/202; 709/238

(58) Field of Classification Search
USPC ........ 705/1, 88, 530, 531, 102; 709/201, 202, 709/203
See application file for complete search history.

(56) References Cited

U.S. PATENT DOCUMENTS

| | | | | |
|---|---|---|---|---|
| 5,159,180 | A * | 10/1992 | Feiler | 235/375 |
| 7,249,026 | B1 | 7/2007 | Bennett et al. | |
| 2002/0042830 | A1 * | 4/2002 | Bose et al. | 709/230 |
| 2003/0112270 | A1 * | 6/2003 | Newell et al. | 345/738 |
| 2004/0260876 | A1 | 12/2004 | Singh et al. | |
| 2005/0177795 | A1 * | 8/2005 | Weiss et al. | 715/753 |
| 2006/0136513 | A1 * | 6/2006 | Ngo et al. | 707/203 |
| 2007/0195159 | A1 | 8/2007 | Packer | |
| 2008/0046260 | A1 | 2/2008 | Ghielmetti et al. | |
| 2009/0254393 | A1 * | 10/2009 | Lollichon | 705/7 |
| 2011/0119102 | A1 * | 5/2011 | Horn et al. | 705/7.13 |

OTHER PUBLICATIONS

Concordance, from LexisNexis: Product description brochure, 2007.
Lawrence Savell, "Electronic Transcript Management Technology for Litigators", American Lawyer Media's Law.com online Feature, Mar. 14, 2007.
Tim Piganelli, "Caselogistix and CT Summation: A close look at tools and features", Litigation Support Today, Feb./Apr. 2008, p. 10.
Merrill Legal Solutions: Overview of discovery, translation, deposition, and trial services.
RealLegal Binder: Product description brochure.
Ron Friedmann, "Lessons Learned in Litigation Support", Mar. 1997.
TrialPro II: Product description brochure.

* cited by examiner

*Primary Examiner* — Dhairya A Patel
(74) *Attorney, Agent, or Firm* — White & Case LLP (57) ABSTRACT

An electronic exhibit management system configured to assign exhibit numbers in real time during a multi-track deposition. The system comprises a main server, one or more client systems networked to the server, and computer code for the functioning of the invention. The system ensures that a each document marked as an exhibit is assigned a unique exhibit number, and prevents a document from being assigned multiple exhibit numbers during multiple depositions. The system finds particular use during multi-track depositions, that is, multiple depositions occurring at the same time in different venues across the country.

17 Claims, 5 Drawing Sheets

DEPOSITION EXHIBIT MANAGEMENT SYSTEM

This application claims the priority benefit of U.S. provisional patent application Ser. No. 61/289,788, filed on Dec. 23, 2009, the contents of which are incorporated by reference herein in their entirety.

FIELD OF THE INVENTION

The present invention relates to the field of computer systems used in litigation, particularly in the pretrial deposition phase of complex civil litigation. In particular, the invention is directed to an electronic exhibit management system configured to assign exhibit numbers in real time during a deposition. The system finds particular use during multi-track depositions, that is, multiple depositions occurring at the same time in different venues, whether in the same city or across the country.

BACKGROUND OF THE INVENTION

In law, a deposition is a witness' out-of-court testimony that is reduced to writing for later use in court or for discovery. During a deposition, a witness will typically be shown a number of documents, termed exhibits, and asked specific questions about these exhibits. Each of the exhibits will be marked, that is, given an identifier code number, the first time a document is introduced during the deposition. For example, an exhibit may be marked as "Plaintiff's Exhibit 4".

If the number of witnesses being deposed in a litigation is small, the list of exhibits introduced by the parties in the litigation can sometimes be fairly short. In such circumstances, exhibit management can be relatively straightforward.

However, in complex litigations, or if there is a large number of witnesses being deposed, the list of exhibits can increase dramatically, and maintaining consecutive exhibit numbering can become challenging. If an attorney deposing a witness is unaware that a particular document was already marked as exhibit during an earlier deposition, for example, by a different attorney, the attorney will reintroduce the same document in a later deposition under a different exhibit number. This action can create confusion in that the same document will be assigned multiple exhibit numbers.

Multi-track depositions, in which multiple witnesses are concurrently deposed, commonly occur in particularly complex litigations. In a multi-track deposition, the same document can be marked during each deposition, thereby increasing the possibility for further contusion. In especially complex multiparty litigations, preparation of tables cross-referencing duplicative deposition exhibits can become necessary, and parties to the litigation will be frequently referring to these cross-referencing tables during subsequent document review and preparation of various pleadings to maintain correct exhibit numbers. Accordingly, there is a need for an exhibit management system which provides consistent control over exhibit numbering and provides remote access to exhibits at any time.

By way of example, ideally in litigation, a party's attorney would prefer to use one set of exhibit identifiers (such as "Plaintiff's Ex. _") for each exhibit marked at the deposition, and then simply retain these exhibit number identifiers all the way through briefing and trial of the action. If the number of witnesses is small and the depositions are not multi-tracked (i.e., scheduled concurrently), a party can use a running consecutive designation like "Plaintiff Ex. _" fairly readily by keeping a running list of the exhibit numbers used and the identification of each document corresponding to an exhibit number.

However, where depositions are multi-tracked and multiple attorneys for the same party are taking such depositions, it becomes very difficult to manage the exhibit list. For example, if a plaintiff's attorney A deposes witness Jones at the same time as plaintiff's attorney B deposes Smith, it is very difficult for attorneys A and B to coordinate the numbering of exhibits as "Plaintiff Ex. _". The problem is that attorney A has no way of knowing what the next exhibit number should be, because attorney B (or other colleagues in the case of several simultaneous depositions) is concurrently marking exhibits in his/her respective deposition.

Often, attorney A will simply mark the exhibits as "Jones Ex. _" and B will mark the exhibits as "Smith Ex. _". This action results in different sets of exhibit identifiers and those identifiers are used in the transcripts of the depositions. Many times, also, the same exact document is marked with different identifiers (such as Jones Ex. 4 or Smith Ex. 8). The problem gets compounded when attorneys for the party continue to use the name of the witness in later depositions as a prefix to the exhibit identifier.

The problem surfaces later in the case during briefing and at trial. At that time, it is preferable to use a single exhibit identifier for each exhibit in the case so that the court (or jury) can more easily follow the exhibits. A party's attorney will therefore need to convert the exhibit identifiers into a single set of consecutive identifiers and create a cross-reference table of all documents marked during depositions, so that it can make appropriate correction in briefing and during trial.

Using the example above, if a party's brief cites to a portion of the Jones deposition referencing "Jones Ex. 4", and a portion of the Smith deposition referring to the same document identified as "Smith Ex. 8", the attorney will need to use the cross-reference table to re-identify the documents with one number, for example, "Plaintiff's Ex. 1", and then identify in the brief that Jones Ex. 4 and Smith Ex. 8 correspond to Plaintiff's Ex. 1. This creates a tremendous amount of work that could be avoided if a single identifier exhibit list is used in the first instance.

SUMMARY OF THE INVENTION

The present invention is intended to address the above problems associated with deposition exhibit management. The present invention is directed to an electronic exhibit management system configured to assign exhibit numbers in real time during one or more depositions occurring simultaneously.

The exhibit management system comprises a main server comprising memory configured for storing a plurality of deposition documents. The main server assigns a unique identifying code to each document, and maintains i) a record associated with each document, including data indicating whether the document has been previously assigned an exhibit number, and ii) a list of the documents assigned exhibit numbers and the next available exhibit number. These records and data may be stored in one or more databases customized for use with the present invention.

The exhibit management system also comprises one or more client systems corresponding to the number of depositions occurring simultaneously, the client systems concurrently networked over a secure protocol to the main server, each client system comprising a display, a data input device, and optionally a barcode reader, and located in-use in one of the depositions of the multi-track deposition.

The main server contains computer code configured for receiving, from a data input device of a client system, a request for a document, the request including data indicating the unique identifying code of such document. The main server retrieves the stored document from memory corresponding to the unique identifying code, and reviews the record associated with the document to determine if the document has previously been assigned an exhibit number.

If the document has not been previously assigned an exhibit number, the main server assigns the next available exhibit number to the stored document, adds the document to the list of documents assigned exhibit numbers, and transmits the assigned exhibit number to the client system. Alternatively, if the document has been previously assigned an exhibit number, the main server retrieves the assigned exhibit number and document properties for the document and transmits the same to the client system.

Each of the stored documents for use with the exhibit management system is loaded into computer memory on the main server. The main server assigns each document with a unique identifying code for use by the document management system. This code may be in any form, sequence or series to conveniently distinguish documents from each other. In one embodiment, the unique identifying code may be the same or similar to a (previously-assigned document number, such as a barcode or a Bates production number assigned to a document during an earlier stage in the litigation or proceeding.

The computer code used in the invention also allows for user upload of deposition documents into memory of the main server, client system, or both. Documents may be uploaded into the server or client system using any kind of convenient means, such as via insertion of a CD or DVD disk, or retrieval from a network drive. Documents may also be uploaded from a scanner, memory stick, digital camera, CD or DVD drive, or the documents may be retrieved from a local or remote repository of documents which is accessed via a direct or networked connection. For example, an Internet connection to another computer in which relevant documents are stored can be used to retrieve documents. The document upload may occur singly, one at a time, or it may occur via a batch process to upload multiple documents.

The computer memory used to store or access documents may be volatile RAM memos such as RAM (random-access memory) on the server, client, or both; or it may be a non-volatile storage medium, such as a computer hard drive, USB memory stick, or compact disc/DVD. In an online cloud-based embodiment of the invention, the documents may be located in the cloud storage system, and retrieved or shared via a network such as an intranet or Internet connection. The documents may be stored in the computer memory in an image or text format, such as PDF, TIF, JPG, RTF, or other format. Documents may be stored in multiple formats, and different documents may be stored in different formats.

Upon receipt of an operator's entry of a document's unique identifying code, the main server will retrieve the requested deposition document from memory. The operator's entry of the identifying code may occur using any conventional means, such as via manual typing of the document number, barcode number, Bates number; scanning the unique identifier using a scanner or barcode reader; or selecting the document from a displayed list of documents using the keyboard or a mouse.

The data input device using in connection with the data management system can be any conventional device, and any client or server can have any number of data input devices. The data input device can be any device which allows an operator to select or access one or more previously uploaded documents for a subsequent operation. Example of data input devices are a mouse, keyboard, trackpad, touch screen, light pen, memory stick, tablet, or barcode reader. The nature of the data input device will depend upon the particular implementation of the invention. For example, the display may contain images or lists of titles of the documents preloaded into memory, and the operator may click on a document name or image using a mouse, light pen, keyboard, or other input means to select a document to be assigned an exhibit number.

For example, when an attorney wishes to mark a document with an exhibit number, the attorney can pass the document to the operator. The operator would obtain the unique identifying code off the document, and would retrieve the document from the set of documents preloaded in the main server's memory. For example, if the document has a barcode, the operator may scan the barcode using a barcode reader or light pen connected to the operator's client system. Alternatively, the operator may retrieve a Bates production number from the document and enter the Bates number using a keyboard. The operator may have a separate copy of each document the attorney may wish to mark in anticipation of assigning exhibit numbers to each of the documents.

The operator's client system would then retrieve the document from memory of the main server and display the document to the operator on the computer display. The operator would then instruct the exhibit management system to assign a particular exhibit number to the retrieved document. This action may occur in the form of clicking with a mouse on a computer icon labeled "Assign Exhibit No.", or touching an icon labeled "Assign Exhibit No," on a touchscreen display; or entering a keystroke such as "A" or "Control-A"; or other comparable action.

If the document has not been preloaded into the computer memory prior to the start of a deposition, the operator can scan the document using a conventional document scanner attached to or near the client system. The document can then be imported into the exhibit management system using an "Import Document" or similar command, and assigned a document number.

If the attorney presents the operator with a document which has already been assigned an exhibit number, the client system will display a message indicating that the document was already assigned "Exhibit No. _". The message may also include supplemental information, such as but not limited to: the date the document was first assigned an exhibit number; the deposition at which the document was first presented; the name of attorney who first marked the exhibit during the proceeding; and the depositions and dates at which the document was cited.

The server will ensure that each client computer has a synchronized list of exhibit numbers to prevent one document from being assigned multiple exhibit numbers. Synchronization is to be understood as sharing information, data (including documents and exhibit numbers), and any updates among computers.

DETAILED DESCRIPTION OF THE INVENTION

The main server comprises memory configured for storing a plurality of deposition documents, each document having been previously assigned a unique identifying code. The server may be a conventional server located at a computing facility or other location, or the server may be cloud-based as understood in the art. The server may be a conventional minicomputer or microcomputer, such as a desktop or laptop computer, and contains the necessary computer instruction code for coordinating and synchronizing all data entered or exchanged among all the computers participating in the depositions. The server may also be configured to retain backups of all exhibits and other data entered during the depositions.

The server may be a remote computer which is not located at a deposition. For example, the server may be located at a vendor site or at a law firm's central computer facility, and the depositions may occur at a hotel or conference center in another city. Alternatively, the server may be a local computer which is located where the depositions are taking place. The server can be portable, or permanently installed at a particular location. The physical location or form of the server is not critical, as long as it contains the necessary code and network connections to coordinate and synchronize the functions of the computers participating in a deposition.

One or more client systems are concurrently networked over a secure protocol to the main server and/or to each other. The client systems may be considered as the actual local computers which will be used by operators for entry of the exhibits and exhibit numbers during a deposition. The client systems may also have other functions, as described herein.

The client systems can be conventional microcomputers or minicomputers, such as laptop or desktop systems which are pre-loaded with the required computer code or software, or they may be custom-designed. If the client system is a laptop computer, the client system has the advantage of being readily transported to various venues where depositions are occurring. The client system can also be a dumb terminal which does not have its own independent processing capabilities, but relies on the computational resources of another computer, such as a server, to which it is attached or networked. The client system comprises a display, a data input device, and optionally a barcode reader, and is located in-use at one of the depositions.

The client systems can be identical, or each may be configured differently, such as having different hardware, running different operating systems, or using distinct network protocols. For example, one client can be running Apple OSX™ and another may be running Microsoft Windows™, while the server may be configured to run on UniX™. The client systems can be computers dedicated for use with the present invention, or the client systems can be general purpose computers to which the necessary computer code of the present invention has been loaded. In such embodiments, the client systems may be loaded with additional software programs useful to users, such as word processors, spreadsheets, presentation packages, databases, and graphical design programs. Any of the client systems can be designated or configured to serve as a monitor system, as discussed herein. The client systems can be in disparate locations, such as in different cities. As long as the client systems can connect in real time to the server over a secure protocol, there is no restriction on the location on any of the client systems.

Each client system does not have to represent exclusively at depositions, as one or more client systems can be used for observation purposes. For example, an attorney may wish to have a legal assistant working on a client system located in an office or other room in which there is no ongoing deposition, in order to review the deposition proceedings and the marking of exhibits. Using the example of FIG. 1 (further discussed below) which illustrates three client systems connected to a server, two of the client systems can be located in deposition rooms and being used in accordance with the invention for marking exhibits during concurrent depositions, and the third client system can be used by the legal assistant for observing the proceedings without actively participating in the exhibit marking.

The computer code for running the management system may be implemented as a standalone software program written in a general-purpose computer programming language such as C/C++ or Java™. The computer code may also be implemented for running in conjunction with another software program, such as within an Internet browser window, for example, Apple Safari™ and Mozilla Firefox™.

For ease of discussion, the invention has been described as a main system networked to one or more local client systems. In other embodiments, the invention may comprise local servers which are networked to the main server and client system(s). The local servers may coordinate the function of the client systems used in a particular multi-track deposition and periodically synchronize the exhibits and numbering with the server. The local servers function in-use similarly to the main server, and be used to store documents, assign exhibit numbers, and synchronize the client systems.

In certain embodiments comprising multi-track depositions, it may be advantageous to delegate to one of the client systems certain functions generally handled by the main server. That is, it may be useful to configure one of the client systems as a "monitor" system, a type of local server or super-client system to which the remaining client systems are subordinate. In such an embodiment, one of the client systems can designated as a monitor system and thereby be "promoted" to function as a local server system. Instead of relying on the main server for coordination of all data exchange and synchronization, the monitor system can be activated during a deposition or other proceeding to manage the display of exhibits and assignment of exhibit numbers. In such embodiments, the monitor system can contain computer code to assign and maintain control of exhibit numbers and exhibit entry, a function which is usually assigned to the main server. The monitor system would synchronize documents and exhibit numbers in accordance as directed, for example, by an operator or the system vendor.

In particular embodiments, there may be a single monitor computer or local server as part of the exhibit management system. In other embodiments, a plurality of client systems can be given monitor status so that the client systems can each have local server/super-user capabilities. Such arrangements will depend on the particular embodiment as determined by the system vendor and/or user(s) of the exhibit management system.

If the distances among clients are relatively short, and the distances between the clients and server are great, a monitor system embodiment allows for more rapid exchange of data by reducing the amount of data sent back and forth by the server and clients. For example, if the server is located in New York, and the depositions are taking place in San Francisco, one of the client systems can be "promoted" to a monitor system, and this monitor system would be responsible for coordinating local data exchange and synchronization among the other client systems in San Francisco. After the depositions are concluded for the day, the monitor system in San Francisco synchronizes its data with the New York server. In this manner, data would be exchanged between the main server and the clients only once, at the end of the day, instead of continuously during the depositions when throughput may be sluggish.

The invention allows for instant retrieval and display of exhibits from the server. That is, when anew exhibit is introduced during a deposition, the main server, local server, or monitor system pushes an instruction to the connected clients and other server(s) to display the exhibit on a display screen, or via a supplemental display device such as a projector, for the benefit of attendees at the deposition. The monitor system can also be delegated by the main or local server to coordinate the assignment of exhibit numbers for exhibits that are introduced at a deposition or other proceeding; the monitor system can also be delegated to upload, display, and assign prospective or tentative exhibit numbers to documents which have not been previously formally entered as exhibits, for example, in order to have a listing of anticipated deposition exhibits before the deposition takes place.

Although a monitor system can be one of the client systems having priority functioning features, in other embodiments, a monitor system may be provided as a separate computer system networked to the server and clients. In such embodiments, the client systems are subordinate to the monitor system as a local server, and the monitor system coordinates its various functions with the main server.

The monitor system or server can also dedicate or reserve for future use certain exhibit numbers or range(s) of exhibit numbers. The monitor system or server can also search and retrieve documents and exhibits from a master database.

In certain instances, it may be necessary to recall or remove an exhibit that was previously introduced during a deposition or other proceeding. For example, if an incorrect document was introduced as an exhibit, the monitor system can provide for the ability to recall the exhibit from the connected client and server systems. When desirable, the recalled document can be substituted with the correct document.

The server and client systems are networked to enable rapid communications via a secure protocol. The secure protocol can be any kind of electronic communications interface which has a high level of security to prevent unauthorized access. In one embodiment, the secure protocol is a cryptographic chat protocol which has security for electronic communications, for example, using SSL or TSL. The server and clients may be networked over a local area network (LAN) connection, a wide area network (WAN), or via an Internet connection. The client and server can also be running any kind of network protocol, such as FTP, TCP/IP, UDP, X.25, SMTP, and SNMP, or be loaded with any operating system, such as Apple OSX™, Microsoft Windows™, Unix™, or a custom-designed operating system.

Although the system is intended to eliminate the occurrence of assigning multiple exhibit numbers to a document, in certain instances an attorney may wish to override this feature. Accordingly, the system may further comprise computer code which assigns anew exhibit number to a deposition document which has already been assigned an exhibit number.

In many instances, each document marked in a deposition will typically already have a Bates production number, a barcode, or some other kind of unique identifier. In certain embodiments of the invention, the document management system will comprise computer code to assign a Bates production number, barcode, or both, to a document which has not been previously assigned a Bates number, barcode, or other identifier. In this manner, a document can be marked as an exhibit and be given the necessary identifying information at the same time in order to reduce time and increase efficiency. In such an instance, the server or a client system may have an attached barcode or production number printer, or a software program or system which assigns and prints barcodes, Bates numbers, or other identifier.

According to the present invention, the server is configured for storing a copy of deposition documents. According to another embodiment of the invention, the exhibit management system may comprise computer code configured to maintain a synchronized local copy of the set of numbered exhibits on the server and each client system. In this embodiment, each local copy is updated when a new exhibit is introduced, thereby ensuring that each computer participating in the depositions will have an up-to-date list of exhibits and the corresponding exhibit numbers. The computer code may also synchronize the plurality of numbered deposition documents, in case any documents are added to the computer memory, but have not yet been formally introduced as new exhibits.

Although the client computers will always synchronize with the main server or a local server, to ensure that exhibit numbers are being assigned in a consecutive and non-duplicative manner, synchronization of local servers and the main server can be ongoing or it may take place at a scheduled time. That is, synchronization of a local server with the main server can take place continuously while the exhibit management system is in use, or such synchronization may take place on a periodic or user-defined schedule, such as in the evenings after working hours.

In certain embodiments of the invention, the exhibit management system may comprise code which allows the server to retrieve documents located in an external litigation support database or storage location. For example, the server may connect to a Case Logistix™, Concordance™, or Summation™ repository of documents, and upon entry of the document number, the exhibit management system can access the document image from the external vendor's storage facility. The server would copy the document image into its memory, and assign the exhibit number to the retrieved document.

In embodiments of the invention, the exhibit management system may have computer code configured to permit an operator to retrieve and view deposition documents on a client system when not connected to the server. In this regard, if a deposition is concluded and a client system is disconnected from the server, the client system will have a local copy of the set of numbered exhibits, and may have any unused deposition documents which have not been introduced as exhibits. An operator of the client system can then retrieve or view the numbered exhibits at any future point on the client system.

In an embodiment of the invention, the server and client systems can be set up for use for a plurality of litigations. That is, the installed computer code is configured to maintain each of a plurality of depositions or litigations in separate "spaces", profiles, projects, or databases to prevent documents from being commingled. Such an embodiment allows the inventive exhibit management system to be used in separate proceedings. In one embodiment, operators are required to login to the exhibit management system, and this login only allows access to specific profiles. This embodiment is particularly useful to prevent operators from accessing litigation documents for which they are not authorized, and different security settings can be given to different individuals.

For example, certain individuals can only be permitted to view assigned exhibits and exhibit numbers, or only updates, whereas other individuals may have higher security permissions and be able to upload documents and to see all documents, whether assigned exhibit numbers or not. In another embodiment, operators may be divided into teams, for example, the prosecution team and the defense team. Operators from one team may be able to see all their team's documents, and are prevented from seeing the other team's documents. Other variations and combinations of security levels and security assignments are possible and within the scope of the present invention.

In certain instances, an attorney may wish to pre-assign exhibit numbers to particular deposition documents to have an approximate list of prospective exhibit numbers. In embodiments of the invention, the system may comprise computer code configured to permit an operator to assign a temporary or prospective exhibit number to a stored deposition document on a client system not connected to the server or when depositions are not in progress. When the client system is reconnected to the server, the management system will synchronize any local and server copies of the set of numbered exhibits so that each computer will have an up-to-date version of the assigned prospective exhibit numbers. Any prospective exhibit numbers would be subject to reassignment in accordance with the method of the invention when depositions resume.

The invention may also comprise computer code configured to retrieve an exhibit document upon the operator's entry of the document's unique identification code, barcode, or Bates production number at a time when depositions are not in progress, such as at the end of the day, or after depositions have concluded. Such an embodiment allows operators to call up documents in the computer memory for viewing or reviewing purposes.

The management system may also comprise computer code configured to concurrently display a stored document or numbered exhibit on any of the other client system displays during use of the exhibit management system. That is, whenever an operator at one client system calls up a document, the management system may display that retrieved document on the display screen of the other client systems which are in-use and networked to the main server. In this manner, all operators of the client systems can see the same document(s) being retrieved and marked simultaneously. This display of the retrieved document can take up the whole client display screen, or it may occur in a window occupying a portion of the display screen. This feature of the invention allows operators of other client systems to see the progress of other concurrent depositions which may be going on at different locations. When the document is called up, the operator can choose to view the document, or to assign the document with an exhibit number as provided herein. The retrieved document may also be displayed on a projector for the benefit of the attendees at the deposition.

The management system may also comprise computer code configured to generate a customizable report of marked exhibits. By selecting particular options, an operator can generate a tailored report which provides information about the exhibits introduced during the depositions. For example, the report may contain information such as the exhibit number, Bates or barcode number, and the date and time each exhibit was first marked or re-introduced. The report may also provide bibliographic document information such as the document title, author, and date of publication. The operator may be able to select different report formats, such as TXT, RFT, HTML, and CSV, as well as being able to choose the fields for inclusion in the report from a list of available fields. The management system may also provide computer code for printing the report or sending the report via E-mail or the Internet to a particular recipient.

The invention will now be described with reference to the drawings. In use, operators of the embodiments of the invention illustrated in FIGS. 1-3 would not see any noticeable differences in assignment of exhibit numbers, as the front interface and method of use would be comparable in all the illustrated embodiments. Synchronization of the client and server systems would vary depending upon the various embodiment, as further discussed below.

Figure 1:
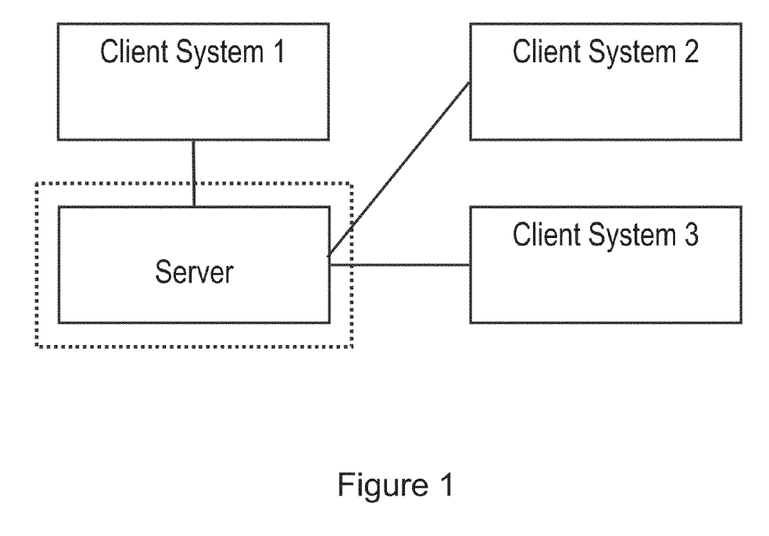
FIG. 1 illustrates an embodiment of the present invention, in which a main server is networked to three client systems over a secure protocol.

FIG. 1 illustrates an embodiment of the present invention, in which a main server is networked to three client systems. The dashed box surrounding the main server signifies that the server is optionally cloud-based, that is, hosted on one or more remote computing systems, data farms, or any other kind of cloud-based computing facility as is known in the art.

In the illustrated embodiment, the main server is concurrently networked with three client systems. The particular number of client systems connected to a server will depend upon the particular deposition schedule as well as the number of operators accessing the system.

To use the exhibit management system, an attorney who is conducting a deposition in Deposition Room 1 containing Client System 1 and wishing to mark a document with an exhibit number, would pass the document to an operator. The operator would obtain the unique identifying code for the document, and enter the unique identifying code into Client System 1, for example, by scanning a barcode using a barcode reader or light pen, or typing in a Bates production number. Client System 1 would retrieve the document from the set of documents preloaded in memory, for example, stored on the Server.

The operator's client system would then retrieve the document from memory and display the document to the operator on the computer display. After confirming the document is the correct one, the operator would then click on a computer icon labeled "Assign Exhibit No.".

If the document has not been previously assigned an exhibit number, Client System 1 will send an electronic request to the Server for the Server to assign a new exhibit number to the document. If the last exhibit number assigned was Plaintiff Exhibit 4, for example, the Server will assign the document at issue as "Plaintiff Exhibit 5". The Server will communicate the exhibit number to Client System 1, which will display the assigned exhibit number on the display. The Server will add the newly-assigned exhibit number to an internal database or data store of exhibit numbers, as well as any other information deemed desirable by the exhibit management system vendor. This additional information can be made configurable by the operator. The deposing attorney will be informed that the subject document was marked as Plaintiff Exhibit 5, and the deposition will continue in its normal course. Any subsequent attempt to assign an exhibit number to the document, whether in the current deposition or in another deposition in the proceedings, will cause the respective Client System to display the previously-assigned exhibit number.

If the document has already been assigned an exhibit number, for example, by an attorney conducting a deposition in Deposition Room 2 containing Client System 2, the Server will not allow the document to be assigned a new exhibit number, and will cause the operator's display connected to Client System 1 to show a message informing the operator that the document was already assigned Plaintiff Exhibit 5 by Client System 2. The operator will inform the deposing attorney that the document was already marked as Plaintiff Exhibit 5, and the deposition will continue in its normal course. The deposing attorney may optionally be provided with the supplemental information during the deposition in the form of a printout or screen display.

Figure 2:
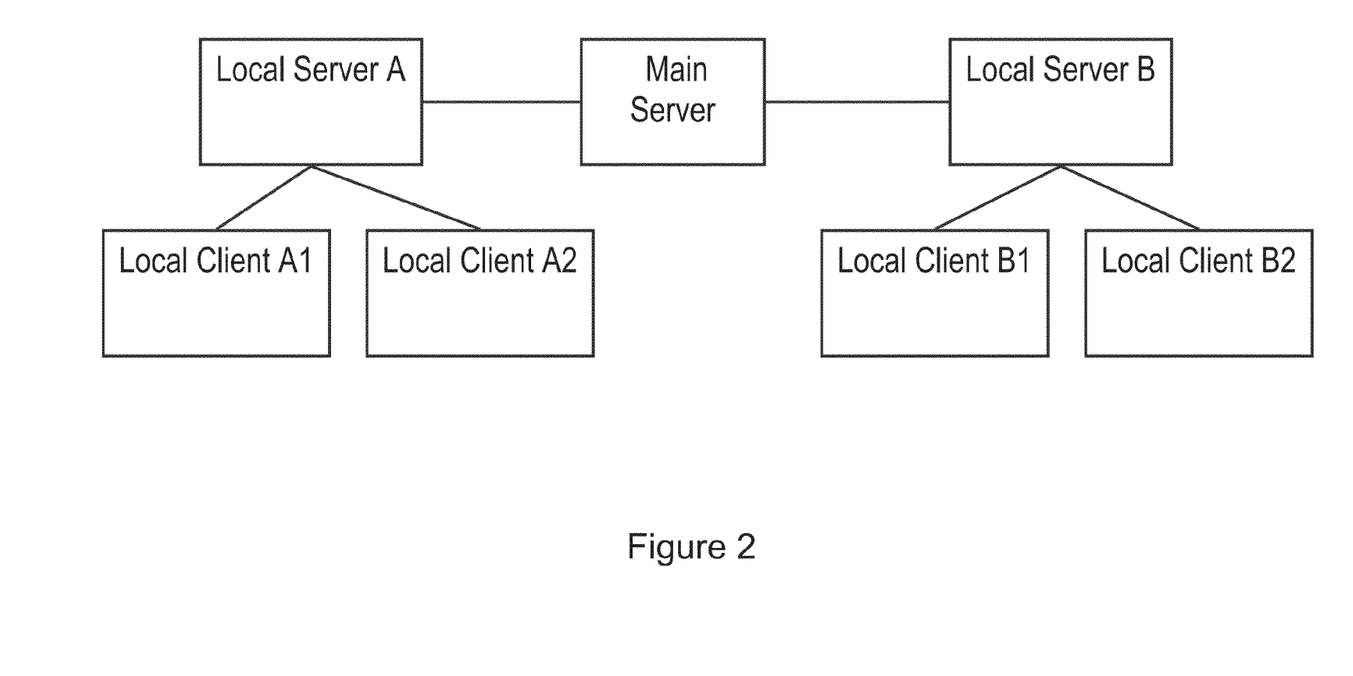
FIG. 2 illustrates a second embodiment of the present invention, in which a main server is networked to two local servers, A and B. Local server A is networked to its local clients A1 and A2, and local server B is networked to its local clients B1 and B2.

FIG. 2 illustrates a second embodiment of the invention, in which a Main Server is networked to two local servers, Local Server A and Local Server B. Local Server A is networked to its Local Clients A1 and A2, and Local Server B is networked to its Local Clients B1 and B2, although consistent with the invention, any number of local servers or client systems may be networked to the Main Server. In use, each local client would be located in a deposition room for use during a deposition. Alternatively, one or more of the local clients can be located outside a deposition room and used by individuals assigned to review the respective proceedings.

The embodiment of the invention illustrated in FIG. 2 can be used for backup of the documents from various litigations or law firms. For example, law firm A may have Local Server A installed in its facility. Local Server A would synchronize and support Local Clients A1 and A2, which in use would be located in depositions at law firm A. Similarly, law firm B may have Local Server B installed at its facility, and Local Clients B1 and B2 would be used in depositions at law firm B. Each Local Server (A or B) would assign exhibit numbers to its supported Client Systems (A1/A2 or B1/B2).

As the depositions take place, Local Servers A and B conduct local synchronization of their respective local clients and with the Main Server. That is, Local Clients A1 and A2 continuously synchronize assignment of exhibit numbers for the documents stored with their Local Server A, and Local Clients B1 and B2 continuously synchronize assignment of exhibit numbers for the documents stored with Local Server B. Local Servers A and B synchronize all their documents and exhibit numbers with the Main Server. Since law firms A and B are functioning independently of each other, the synchronization between the Local Servers and the Main Server can take place continuously or when server use is minimal, such as in the evenings. In this manner, the Main Server serves as a backup system containing a full set of all exhibit numbers and documents used by law firms A and B in their respective litigations. Each law firm's documents would be stored in the main server as separate projects or spaces without commingling.

Figure 3:
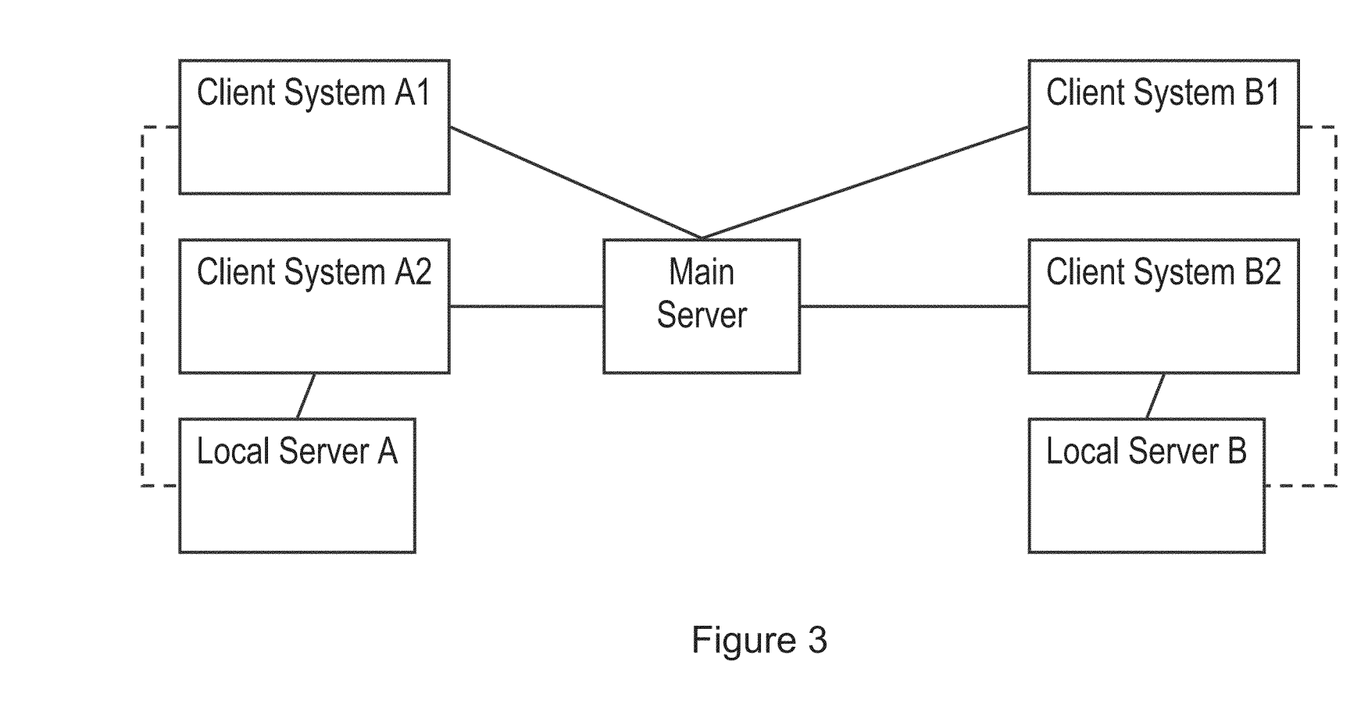
FIG. 3 illustrates a third embodiment of the present invention, in which a main server is networked with client systems A1 and A2 and their local server A, and is also separately networked with client systems B1 and B2 and their local server B.

FIG. 3 illustrates a third embodiment of the invention which combines various aspects of the embodiments illustrated in FIGS. 1 and 2. In FIG. 3, a Main Server is networked with four client systems, A1, A2, B1, and B2. One of the four client systems (A2) is directly networked to Local Server A, and another of the four client systems (B2) is directly networked to another Local Server B. As illustrated with a dashed line, Local Server A is indirectly networked with Client System A1, and Local Server B is indirectly networked with Client System B1. Each set of local server and client systems A/A1/A2 and B/B1/B2 can be used for separate litigations or by different firms or for different projects, or all the illustrated computer systems can be used for different aspects of one large litigation.

In the embodiment illustrated in FIG. 3, each client system is synchronized to contain a full set of exhibit documents and exhibit numbers, and the local servers can be used as backup systems for archival or storage. Since each Client System A1, A2, B1, and B2 is being synchronized with the Main Server, each respective Client System A1/A2 or B1/B2 contains a full set of assigned documents and exhibit numbers for the respective project (A or B) supported by Local Server A or B.

Figure 4:
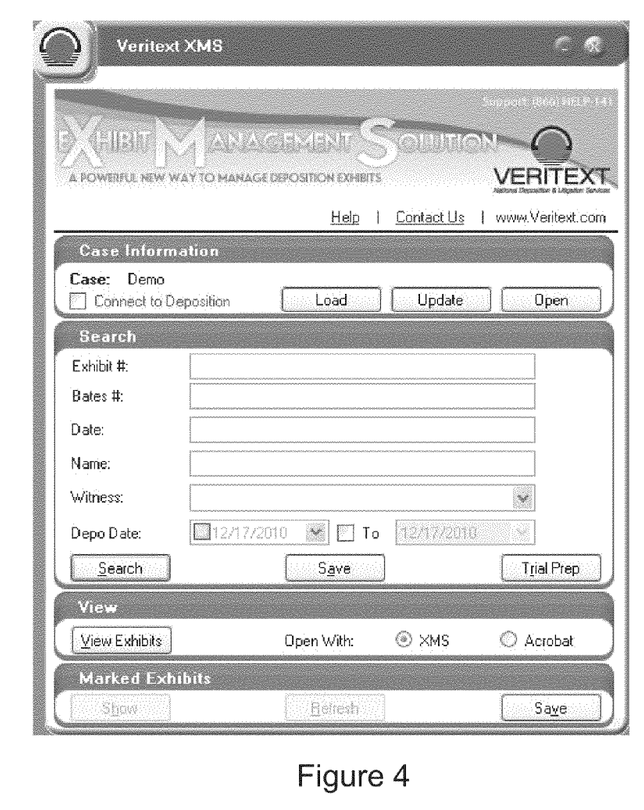
FIG. 4 illustrates a screen shot of an embodiment of an operator interface (also termed a manager interface) to the invention.

FIG. 4 illustrates a screen shot of an embodiment of an operator interface to the invention. The interface will be used by an operator during an in-progress deposition in any location to retrieve and mark exhibits for a deposition. The interface can also be used offline when there are no depositions in progress in order to upload documents and handle other activities which do not require the deposition to be in-progress. Each operator will be using the invention through such an interface to allow for assignment of exhibit numbers during concurrent proceedings of multi-track depositions. In one embodiment, the operator interface can be termed a "manager interface" since it is the interface used by an operator to manage the assignment of exhibit numbers to documents. Operation of the invention to assign exhibit numbers via the operator interface can be performed by a court reporter, IT technician, paralegal, or other designated individual.

In the illustrated embodiment, the operator interface contains fields for entry of an exhibit number, Bates number, date, name, witness name, or deposition date to locate and retrieve a particular document which is to be marked as an exhibit and assigned an exhibit number. Additional fields can be implemented for use in search or retrieval of documents. Alternatively, a barcode reader can be used to scan a document barcode and automatically retrieve the respective document from the computer database. After an operator retrieves a document, the document image and document properties will be displayed on the operator's screen and pushed to other connected computers (such as other operator/manager and viewer computers), and the operator can assign the document an exhibit number. The interface also contains options to load documents, and to view exhibits using an internal viewer or a standard image viewer such as Adobe Acrobat™. The interface also contains options to connect to a deposition, or to update deposition data or settings.

Figure 5:
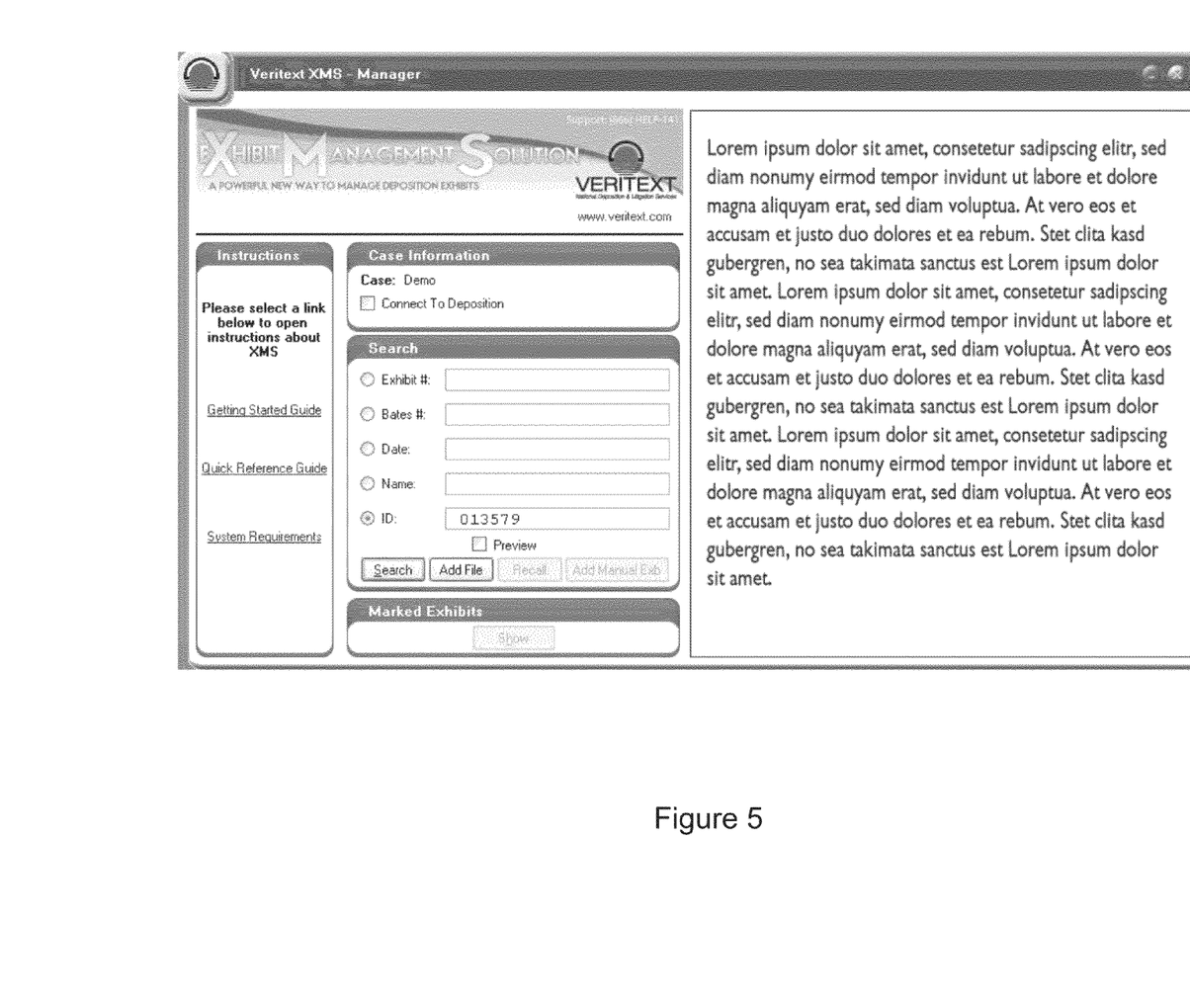
FIG. 5 illustrates a screen shot of an embodiment of a viewer interface to the invention.

FIG. 5 illustrates a screen shot of an embodiment of a viewer interface to the invention. The viewer interface allows for document retrieval and viewing, but the viewer interface is not configured to allow assignment of exhibit numbers during a deposition. The viewer interface can be implemented on any computer anywhere in the world. The viewer interface can be termed a "client interface" since the viewer interface can watch ongoing proceedings or be pushed a document for view as soon as an operator assigns the next consecutive exhibit number, but the viewer cannot assign exhibit numbers. When a document is pushed to the viewer interface, the document image and document properties can be viewed in a window on the screen, or the document can take up the full-screen.

In the illustrated example, the viewer interface shows document number 013579 on display in the document viewer on the right side of the interface. The viewer interface can also allow for display of a document in a separate window, for example, in PDF, TIFF, or JPG format. The viewer interface can be used in live mode, while a deposition is in-progress, to see the live assignment of exhibit numbers, or the viewer interface can be used in offline mode, to review documents or to see the assigned exhibit numbers. Depending upon the particular implementation and security/permissions level assigned to a particular login, the viewer can have greater or lesser functionality than the embodiment illustrated.

Other advantages of the described systems will be apparent to those of skill in the art.

In addition to the embodiments of the present invention described above, those skilled in the art will be able to arrive at a variety of other arrangements and steps which, if not explicitly described in this document, nevertheless embody the principles of the invention and fall within the scope of the appended claims.

What is claimed is:

1. An electronic exhibit management system for use at a plurality of multi-tracked depositions, the system configured for assigning exhibit numbers in real time during said depositions, the system comprising a processor and:
   (a) a main server comprising memory configured for storing a plurality of deposition documents, the main server assigning a unique identifying code to each document, and maintaining i) a record associated with each document, including data indicating whether the document has been previously assigned an exhibit number, and ii) a list of the documents assigned exhibit numbers and the next available exhibit number;
   (b) at least one client system located in-use at each of the plurality of simultaneous depositions occurring simultaneously at different locations, the client systems concurrently networked over a secure protocol to the main server, each client system comprising a display, a data input device, and optionally a barcode reader; and
   (c) the main server containing computer code configured for:
      1. receiving, from a data input device of a client system during one of the plurality of depositions, a request for a document, the request including data indicating the unique identifying code of such document;
      2. retrieving from memory the stored document corresponding to the unique identifying code; and
      3. reviewing the record associated with the document to determine if the document has previously been assigned an exhibit number; and
      4a. if the document has not been previously assigned an exhibit number, assigning by the system the next available exhibit number to the stored document, adding the document to the list of documents assigned exhibit numbers, and transmitting to the client system the assigned exhibit number during the deposition; or
      4b. if the document has been previously assigned an exhibit number, retrieving the assigned exhibit number and document properties for the document and transmitting the same to the client system during the deposition;
   wherein the system further comprises computer code configured to:
   (d) maintain a synchronized local copy of the list of documents assigned exhibit numbers on each client system, wherein each local copy is updated when a new exhibit is introduced,
   (e) permit an operator to assign a prospective exhibit number to a stored deposition document on a client system when not connected to the server, and
   (f) synchronize local and server copies of the numbered exhibits when the client system is reconnected to the server.

2. The system according to claim 1, wherein the main server is a remote computer or a local computer or wherein the main server is cloud-based.

3. The system according to claim 1, wherein the unique identifying code is a barcode identification.

4. The system according to claim 1, wherein the unique identifying code is a Bates production number.

5. The system according to claim 1, further comprising computer code to upload deposition documents into memory in the main server singly or via a batch process.

6. The system according to claim 1, wherein the data input device comprises one or more devices selected from the group consisting of a mouse, keyboard, trackpad, touch screen, light pen, memory stick, tablet, barcode reader, or scanner.

7. The system according to claim 1, wherein the deposition documents are uploaded using a scanner, digital camera, CD drive, DVD drive, memory stick, or from a local or remote source of deposition documents accessed via a network connection.

8. The system according to claim 1, further comprising computer code configured to permit an operator to assign a new exhibit number to a deposition document which has already been assigned an exhibit number.

9. The system according to claim 1, further comprising computer code to assign a Bates production number, barcode, or both, to a document which has not been previously assigned a Bates production number or barcode.

10. The system according to claim 1, wherein the secure protocol is a chat protocol.

11. The system according to claim 1, wherein the server and client systems are networked over a local area network (LAN), a wide area network (WAN), or via an Internet connection.

12. The system according to claim 1, further comprising computer code configured to permit an operator to retrieve and view deposition documents or numbered exhibits on a client system when not connected to the server.

13. The system according to claim 1, further comprising computer code configured to concurrently display a stored document or numbered exhibit on any of the client system displays during use of the exhibit management system.

14. The system according to claim 1, further comprising computer code configured to generate a customizable report of marked exhibits.

15. The system according to claim 1, further comprising computer code configured to retrieve an exhibit document upon an operator's entry of the document's unique identifying code, barcode, or Bates production number.

16. The system according to claim 1, further comprising one or more local servers operationally connected to the main server and the client systems, the local servers having memory configured for storing local copies of the deposition documents and the list of numbered exhibits.

17. The system according to claim 1, further comprising computer code configured to generate a customizable report of numbered exhibits.

* * * * *